(12) United States Patent  
Oshida

(10) Patent No.: US 7,685,473 B2  
(45) Date of Patent: Mar. 23, 2010

(54) COMPUTER SYSTEM, METHOD OF DETECTING A STALL IN A COMPUTER SYSTEM, AND SIGNAL-BEARING MEDIUM EMBODYING A PROGRAM CAUSING A COMPUTER SYSTEM TO PERFORM A METHOD OF DETECTING A STALL IN A COMPUTER SYSTEM

(75) Inventor: Hiroaki Oshida, Tokyo (JP)

(73) Assignee: NEC Corporation, Tokyo (JP)

( * ) Notice: Subject to any disclaimer, the term of this patent is extended or adjusted under 35 U.S.C. 154(b) by 865 days.

(21) Appl. No.: 11/296,484

(22) Filed: Dec. 8, 2005

(65) Prior Publication Data

US 2006/0136789 A1 Jun. 22, 2006

(30) Foreign Application Priority Data

Dec. 16, 2004 (JP) ............................. 2004-364955

(51) Int. Cl.
*G06F 11/00* (2006.01)
(52) U.S. Cl. .............................. 714/43; 714/25; 714/44
(58) Field of Classification Search ................... 714/43
See application file for complete search history.

(56) References Cited

U.S. PATENT DOCUMENTS

| | | | | |
|---|---|---|---|---|
| 5,067,071 A * | 11/1991 | Schanin et al. | ............... | 710/113 |
| 5,682,551 A * | 10/1997 | Pawlowski et al. | ............. | 710/36 |
| 5,742,843 A * | 4/1998 | Koyanagi et al. | ............. | 712/14 |
| 5,826,003 A * | 10/1998 | Matoba et al. | ................. | 714/7 |
| 5,978,938 A * | 11/1999 | Kaiser et al. | ................... | 714/48 |
| 6,000,043 A * | 12/1999 | Abramson | ..................... | 714/44 |
| 6,256,753 B1 * | 7/2001 | Williams | ...................... | 714/47 |
| 6,292,910 B1 * | 9/2001 | Cummins | ..................... | 714/43 |
| 6,804,800 B2 * | 10/2004 | Rodriguez | .................... | 714/56 |
| 6,829,729 B2 * | 12/2004 | Hicks et al. | ................... | 714/30 |
| 6,996,750 B2 * | 2/2006 | Tetreault | ...................... | 714/44 |
| 7,069,477 B2 * | 6/2006 | Bland et al. | ................... | 714/43 |
| 7,278,062 B2 * | 10/2007 | Moyer et al. | .................. | 714/43 |
| 7,343,528 B2 * | 3/2008 | Rodriguez | .................... | 714/56 |
| 2002/0124207 A1 * | 9/2002 | Ohwada | ...................... | 714/36 |
| 2004/0088604 A1 * | 5/2004 | Bland et al. | ................... | 714/43 |
| 2005/0060472 A1 * | 3/2005 | Mantey et al. | .............. | 710/305 |

FOREIGN PATENT DOCUMENTS

| | | |
|---|---|---|
| JP | 64-76256 | 3/1989 |
| JP | 9-34809 | 2/1997 |
| JP | 2002-215557 | 8/2002 |

OTHER PUBLICATIONS

Japanese Office Action dated Feb. 17, 2009, with partial English translation.

* cited by examiner

*Primary Examiner*—Scott T Baderman
*Assistant Examiner*—Kamini Patel
(74) *Attorney, Agent, or Firm*—McGinn IP Law Group, PLLC

(57) ABSTRACT

A computer system includes a processor that executes a device driver, and a bus controller that controls an input/output bus that connects a plurality of input/output devices. The bus controller includes a stall detector that detects a stall state of the input/output bus and an error reply generator that transmits an error reply to the processor regarding a transaction transmitted to the input/output bus where the stall state is detected.

24 Claims, 10 Drawing Sheets

COMPUTER SYSTEM, METHOD OF DETECTING A STALL IN A COMPUTER SYSTEM, AND SIGNAL-BEARING MEDIUM EMBODYING A PROGRAM CAUSING A COMPUTER SYSTEM TO PERFORM A METHOD OF DETECTING A STALL IN A COMPUTER SYSTEM

BACKGROUND OF THE INVENTION

1. Field of the Invention

The present invention relates to a computer system, a method of detecting a stall (e.g., a non idle state which continues for more than a predetermined period of time) in a computer system, and a signal-bearing medium embodying a program causing a computer system to perform a method of detecting a stall in a computer system, and in particular, it relates to a computer system and a system monitor program, which allows the system to stably operate without suffering from adverse effect due to fault of an input/output bus.

2. Conventional Art

Heretofore, a computer system has included a large number of processors and input/output buses (e.g., PCIs (Peripheral Component Interconnects)) which are connected for one system such as a multi processor system including 16 to 32 processors, and a multi-processor system having input/output bus slots (e.g., PCI bus slots) including more than 64 processors.

Such a computer system, in general, has been often used for an application (i.e., a mission critical application) which is required to be highly reliable and fault-tolerant. Consequently, high availability is required. Hence, a technology relating to fault detection and its processing such as capable of minimizing the effect of an error has been required.

Japanese Patent Laid-Open No. 2002-215557 discloses detection of a phenomenon (totally different from a "stall" referred to by the present invention) in which a plurality of target devices reply to the detection of an error in the PCI bus, in particular, one of the PCI cycles.

SUMMARY OF THE INVENTION

First, referring to the PCI (Peripheral Component Interconnect) bus as an example, a problem of the conventional art will be described.

FIG. 7 is a view showing a structure of the computer system including a large number of the PCI buses. In FIG. 7, processor (e.g., CPU: Central Processing Unit) 1001 is connected to memory controller (e.g., MMC: Main Memory Controller) 1003 through a processor bus (e.g., FSB: Front Side Bus) (not shown).

Memory controller 1003 includes interfaces (hereinafter referred to also as "I/F") of main memory unit (e.g., MMU: Main Memory Unit) 1002 and I/O controller (e.g., ICO: Input Output Control) 1004 in addition to an I/F (interface) with processor 1001.

I/O controller 1004 includes an I/F with bus controller (e.g., BUSC: Bus Control) 1005 in addition to the I/F with Memory controller 1003. Bus controller 1005 has PCI buses 1100 connected under its command, and performs data transmission by operation protocol based on PCI bus specifications. PCI bus 1100 can be connected with a plurality of peripheral equipments (e.g., PCI device).

Memory controller 1003 and I/O controller 1004 perform a routing of transactions received from processor 1001 and Bus controller 1005, and perform a routing according to the address for every transaction.

The memory controller 1003, I/O controller 1004, and Bus controller 1005 are a unit configured by one to plural LSIs (Large Scale Integrated Circuits) according to a system scale and its structure.

In the computer system described above, a direct access to the PCI device from processor 1001 and an access to the main memory unit 1002 with the PCI device as a starting point are performed. Hereinafter, the direct access operation from processor 1001 to the PCI device will be described with reference to FIG. 7.

First, the case of an I/O read (e.g., an outbound read) from processor 1001 to the PCI device will be described.

For the I/O read from processor 1001, the read transaction from processor 1001 to the PCI device is transmitted from Memory controller 1003 to I/O controller 1004 through the processor bus (FSB).

The read transaction having reached I/O controller 1004 is further transmitted to Bus controller 1005. The transaction having been routed to Bus controller 1005 is converted into a PCI bus transaction by the Bus controller 1005 so as to be transmitted to PCI bus 1100, thereby reaching a target PCI device.

The transmission operation of the transaction on this PCI bus 1100 uses a general PCI bus cycle (e.g., a memory cycle, an I/O cycle, a configuration cycle, and the like).

Thereafter, a reply and read data from the PCI device traces a route reverse to that described above, and is returned to processor 1001 which is an issuing source of the transaction from PCI bus 1100 through Bus controller 1005, I/O controller 1004, Memory controller 1003, and the processor bus (FSB).

If the transmission of the transaction to PCI bus 1100 fails due to fault and the like, then the following operation is performed. If an error of PCI bus 1100 such as an address parity error and the like occurs, then the PCI device detects the error, and drives a system error line SERR (System Error) #, and the bus controller 5 having detected the error notifies processor 1001 of the error by an NMI (Non Maskable Interrupt) signal line.

If an error of PCI bus 1100 such as a data parity error and the like is detected, then Bus controller 1005 detects the error, and drives a parity error line PERR (Parity Error) #, thereby returning an error reply instead of a read reply.

The error reply is different from a normal reply, and is a reply for notifying processor 1001 that the transaction transmitted from processor 1001 does not normally complete.

Hereinbelow, an I/O write (outbound write) to the PCI device from processor 1001 is described.

The write toward the PCI device from processor 1001 has two types of transactions defined: a write (e.g., a deferred write) of a deferred type in which processor 1001 waits for the reply of a write completion toward the PCI device, and a write (e.g., a posted write) in which processor 1001 does not wait for the reply of a write completion.

For the deferred write transaction, the write transaction is routed to Bus controller 1005 by tracing the same route as the I/O read as described above. The write transaction routed to Bus controller 1005 is converted into a PCI bus transaction by Bus controller 1005, and is sent to PCI bus 1100, thereby reaching a target PCI device.

Thereafter, Bus controller 1005 having confirmed the transmission of all the data (completion of the PCI bus cycle) issues a write reply. This write reply is returned to processor 1001 which is the issuing source of the transaction from PCI bus 1100 by tracing a route in reverse to the above described route through Bus controller 1005, I/O controller 1004, Memory controller 1003, and the processor bus.

In the meantime, for the posted write transaction, processor 1001 takes the write operation as completed at the point of time when the transmission of the transaction is completed, and performs a routing of the transmitted posted write toward the target PCI device, and completes the operation as a transaction at the point of time when the transmission of all the data of PCI bus 1100 is completed.

If the transmission of the transaction toward PCI bus 1100 fails due to fault and the like, then the following operation is performed. If an error of PCI bus 1100 such as an address parity error and the like occurs, then the PCI device detects the error, and drives a system error line SERR #, and the bus controller 5 having detected the error notifies processor 1001 of the error by an NMI signal line.

If an error of PCI bus 1100 such as a parity error and the like is detected, then the PCI device drives the parity error line PERR#, and Bus controller 1005 detects the error, and notifies processor 1001 of the error. Here, for the data parity error of the deferred write, Bus controller 1005 transmits an error reply instead of a normal reply. For the data parity error of the posted write, Bus controller 1005 notifies the error by the NMI signal line.

FIG. 8 is a view showing detailed structures of I/O controller 1004 and Bus controller 1005. I/O controller 1004 includes memory controller and interface control unit 1041 to control interface with Memory controller 1003, bus controller and interface control unit 1042 to control an interface with Bus controller 1005, non-execution transaction management table 1043 to hold information regarding the non-execution transaction from the processor, and an under-execution transaction management table 1044 to hold information regarding the under-execution transaction from the processor.

Further, Bus controller 1005 includes an I/O controller and interface control unit 51 to control the interface with I/O controller 1004, a PCI bus control unit 1052 to control PCI bus 1100, a request queue 1053 to hold information regarding an execution request transaction from the processor, and a reply queue 1054 to hold information regarding a reply transaction to the processor.

In the structure described above, the transaction having reached I/O controller 1004 is received by memory controller and interface control unit 1041, and is stored in non-execution transaction management table 1043 to hold information regarding the non-transaction transaction from the processor. The transaction stored in non-execution transaction management table 1043 is transmitted to Bus controller 1005 through bus controller and interface control unit 1042. At this time, if the transaction is a read request or a deferred write request, then various pieces of information (e.g., types of transaction, reply and return destination processor discrimination, and the like) regarding the transaction in which the reply must be returned when the reply is received from Bus controller 1005 are in under-execution transaction management table 1044.

The transaction having reached Bus controller 1005 is received by the I/O controller and interface control unit 1051, and is stored in request queue 1053 to hold information regarding the execution request transaction from the processor. The transaction having been stored in request queue 1053 is transmitted to PCI bus 1100 through PCI bus control unit 1052. When the data transfer regarding the transaction is completed at PCI bus 1100, if the transaction is a read request or a deferred write request, then the reply information (e.g., normal and abnormal discrimination of the execution result and information regarding the read data) regarding the transaction is stored in reply queue 1054 which holds the information regarding the reply transaction to the processor. The transaction having been stored in reply queue 1054 is transmitted to I/O controller 1004 through the I/O controller and interface control 1051.

The reply information of the transaction having reached I/O controller 1004 is received by bus controller and interface control unit 1042, and is combined with the information regarding the under-execution transaction stored earlier in under-execution transaction management table 1044, and is transmitted to Memory controller 1003 through memory controller and interface control unit 1041.

Here, if the data transmission is normally executed at PCI bus 1100, the reply information shows a normal end (e.g., normal reply). However, if a fault such as a parity error and the like occurs in the PCI bus during the access to the PCI device from the processor, an occurrence of the error is notified to the NMI signal line or the processor by the error reply by the assertion of the system error signal line SERR#. This allows an appropriate exception handler to be executed, thereby making it possible to execute a failure recovery process.

However, if the stall state (e.g., a non idle state which continues for more than a predetermined period of time) occurs in the PCI bus during the access to the PCI device from processor 1001, Bus controller 1005 is unable to complete the under-execution transaction, and is unable to return a reply to the under-execution transaction. Processor 1001 waiting for the reply regarding the under-execution transaction is put into a state unable to receive a reply.

Further, Processor 1001, which is the transmitting source of these transactions, determines that a severe disability which makes it difficult to perform continuous operation of the system occurs, and places the system into an abnormal stop (e.g., "system down") condition. This suggests that a "time out (e.g., a timing out)" occurs on the transaction issued by the processor, and the system may be put disadvantageously into an unstable state.

As described above, in the conventional computer system, if the transaction issued from the processor to the input/output device (e.g., PCI device) runs into the stall state of the input/output bus or is entangled into the stall state, no reply can be returned to the processor having issued the transaction. Therefore, the transaction "times out," thereby starting a system down operation.

In view of the foregoing and other exemplary problems, drawbacks, and disadvantages of the conventional techniques, it is an exemplary feature of the present invention to provide a computer system, a method of detecting a stall in a computer system, and a signal-bearing medium embodying a program causing a computer system to perform a method of detecting a stall in a computer system which may prevent an abnormal stop of the system due to a stall state of the bus represented by the above described example, thereby making it possible to improve greatly reliability.

The present invention provides a computer system which includes a processor that executes a device driver, and a bus controller that controls an input/output bus that connects a plurality of input/output devices. The bus controller includes a stall detector that detects a stall state of the input/output bus and an error reply generator that transmits an error reply to the processor regarding a transaction transmitted to the input/output bus where the stall state is detected.

The stall detector may detect a stall state by measuring a non-idle time of the bus.

The computer system may further include a main memory, a main memory controller operatively coupled to the main memory, and an I/O controller, operatively coupled to the main memory controller, that performs an execution management of the transaction, and transmits an error reply regarding under-execution and non-reply transactions to the processor, the I/O controller includes the error reply generator.

The computer system may further include a failure notifier that receives a stall detection signal from the stall detector and notifies the error reply generator of a failure information, the bus controller including the failure notifier. In accordance with present invention, the error reply generator may receive the failure information from the failure notifier and transmits an error reply to the processor regarding the transaction relating to the input/output bus which is given the failure information.

The I/O controller may include a non-execution transaction list that holds a non-execution transaction, and an under-execution transaction list that holds under-execution and non-reply transaction. In accordance with the present invention, the I/O controller may renew the non-execution transaction list and the under-execution transaction list by, holding back a transaction, relating to the input/output bus which is given the failure information, from being transmitted to the bus controller, adding the transaction to the under-execution transaction list, transmitting an error reply to the processor regarding the transaction, and erasing the transaction from the under-execution transaction list.

The computer system may further include a service processor that is connected to the bus controller. In accordance with the present invention the bus controller may include a diagnosis controller that reads a value of a control register of the bus controller by an instruction of the service processor, and transmits a stall detection signal to the failure notifier by an instruction of the service processor.

The stall detector may detect a stall state according to whether or not a busy state of the input/output bus continues for a predetermined period of time based on a value of a control register of a bus control unit of the bus controller.

The input/output bus may include a PCI (Peripheral Component Interconnect) bus.

The present invention also provides a method of detecting a stall in a computer system including providing a processor that executes a device driver, controlling, by a bus controller, an input/output bus that connects a plurality of input/output devices, detecting a stall state of the input/output bus; and transmitting an error reply to the processor regarding a transaction transmitted to the input/output bus where the stall state is detected.

The method of detecting a stall in a computer system may further include detecting a stall state by measuring a non-idle time of the input/output bus.

The method of detecting a stall in a computer system may further include performing, by an I/O controller, execution management of the transaction, and transmitting an error reply regarding under-execution and non-reply transactions to the processor.

The method of detecting a stall in a computer system may further include notifying, by the bus controller, the I/O controller of a failure information, and transmitting, by the I/O controller, an error reply to the processor regarding a transaction relating to the input/output bus which is given the failure information.

The method of detecting a stall in a computer system may further include holding, by a non-execution transaction list, a non-execution transaction with the I/O controller, holding, by an under-execution transaction list, an under-execution and non-reply transaction with the I/O controller, and renewing the non-execution transaction list and the under-execution transaction list by, holding back a transaction, relating to the input/output bus which is given the failure information from being transmitted to the bus controller, adding the transaction to the under-execution transaction list, transmitting an error reply to the processor regarding the transaction, and erasing the transaction from the under-execution transaction list.

The method of detecting a stall in a computer system may further including connecting a service processor to the bus controller, reading a value of a control register of the bus controller by an instruction of the service processor, and transmitting a stall detection signal to a failure notifier by an instruction of the service processor.

The method of detecting a stall in a computer system may further include detecting a stall state according to whether or not a busy state of the input/output bus continues for a predetermined period of time based on a value of a control register of a bus control unit of the bus controller.

The method of detecting a stall in a computer system may further include providing a PCI (Peripheral Component Interconnect) bus as the input output bus.

The method of detecting a stall in a computer may further include issuing a transaction to a main memory controller, forwarding the transaction to an I/O controller, registering the transaction to a non-execution transaction list, retrieving the transaction from the non-execution transaction list, judging whether the transaction includes a "read or deferred write request", when the transaction includes the "read or deferred write request", registering the information regarding a reply to an under-execution transaction list, and after registering the information regarding the reply to the under-execution transaction list or when the transaction includes the "read or deferred write request", judging whether the I/O controller has already received a failure notification.

The method of detecting a stall in a computer system may further include when the I/O controller has not already received the failure notification, forwarding the transaction to the bus controller, registering the transaction to a received request queue, retrieving the transaction from the request queue, outputting the transaction to the input/output bus, and judging whether the transaction is completed.

The method of detecting a stall in a computer system may further include when the transaction is completed, judging whether the transaction includes the "read or deferred write request", when the transaction includes the "read or deferred write request", storing a transaction execution result in a reply queue, retrieving the transaction from the reply queue, forwarding the transaction to the I/O controller, when the transaction is not completed, judging whether a stall detector detect a stall, when the stall detector does not detect a stall, judging whether the transaction is completed, and when the stall detector detects a stall, transmitting a failure notification to the I/O controller.

The method of detecting a stall in a computer system may further include when the I/O controller has already received the failure notification or after transmitting the failure notification to the I/O controller, performing an abnormal end process regarding the transaction stored in the under-execution transaction list, when forwarding the transaction to the I/O controller or after performing abnormal end process regarding the transaction stored in the under-execution transaction list, retrieving the transaction from the under-execution transaction list and forwarding the transaction to the main memory controller, and forwarding the transaction to the processor.

The method of detecting a stall in a computer system may further include issuing a read request of a control register of the bus controller to a service processor, issuing the read request of the control register to a diagnosis controller, reading the control register and replying to the service processor, issuing the control register information to the processor, judging whether a stall state exists from read information of the control register, when detecting a stall state, instructing the service processor to set the bus controller to a failure state, instructing the diagnosis controller to set a failure state, and setting a failure notifier to a failure state.

The present invention also provides a signal-bearing medium embodying a program of machine-readable instructions executable by a digital processing apparatus, the program causing a computer system to perform the method described above.

According to the present invention, for example, a highly reliable computer system capable of notifying a processor that a bus runs into a stall state and appropriately coping with this state may be realized. This may be because the computer is configured in such a manner as to be able to detect a stall state of the bus and reliably notify the processor of an abnormal end (e.g., error reply).

BRIEF DESCRIPTION OF THE DRAWINGS

The novel and exemplary features believed characteristic of the invention are set forth in the appended claims. The invention itself, however, as well as other exemplary features and advantages thereof, will be best understood by reference to the detailed description which follows, read in conjunction with the accompanying drawings, wherein:

DETAILED DESCRIPTION OF THE EXEMPLARY EMBODIMENTS

First Exemplary Embodiment

Figure 1:
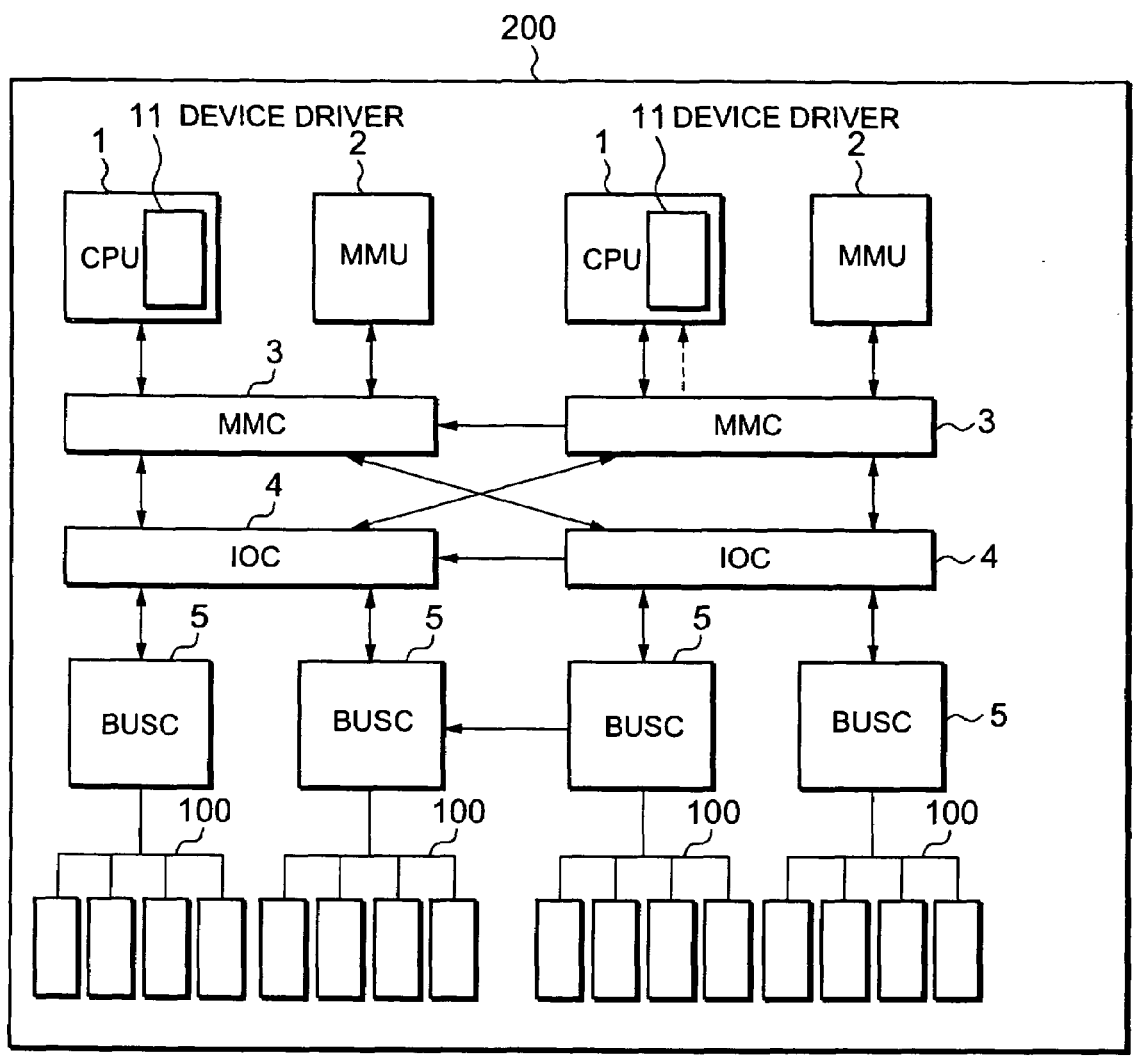
FIG. 1 is a view showing an exemplary structure of computer system 200 according to a first exemplary embodiment of the present invention.

Hereinbelow, the best mode of carrying out the present invention will be described in detail with reference to the drawings. FIG. 1 is a block diagram showing an exemplary structure of computer system 200 according to a first exemplary embodiment of the present invention. Referring to FIG. 1, the computer system according to the first exemplary embodiment of the present invention, similarly to the above described conventional computer system 1200, may be configured by including processor (e.g., CPU) 1, main memory unit (MMU) 2, main memory controller (MMC) 3, I/O controller (Input Output controller, IOC) 4, and bus controller (BUSC) 5.

Processor 1 may execute a device driver 11 which manages information about operating a plurality of devices (e.g., PCI devices). Processor 1 may be connected to memory controller 3 through a processor bus (FSB) (not illustrated).

Memory controller 3 may include interfaces of main memory unit 2 and I/O controller 4 in addition to the interface with processor 1.

I/O controller 4 may include the interface with bus controller 5 in addition to the interface with memory controller 3.

A plurality of ones of the bus controller 5 may be provided, and may have an input/output bus (e.g., PCI bus 100) connected under its command, respectively. Bus controller 5 may perform a data transmission by operation protocol based on PCI bus specifications. PCI bus 100 can be connected to a plurality of PCI devices.

On processor 1, a device driver (not illustrated) to control the input/output device (e.g., PCI device 100) may operate, and the processor issues a transaction for the PCI device according to the operation of the device driver. The transaction issued by processor 1 is transmitted to bus controller 5 through memory controller 3 and I/O controller 4.

Memory controller 3 and I/O controller 4 may perform a routing of the transaction so that the transaction received from processor 1 and bus controller 5 reaches the bus or the main memory unit 2 which becomes the destination of the transaction.

Figure 2:
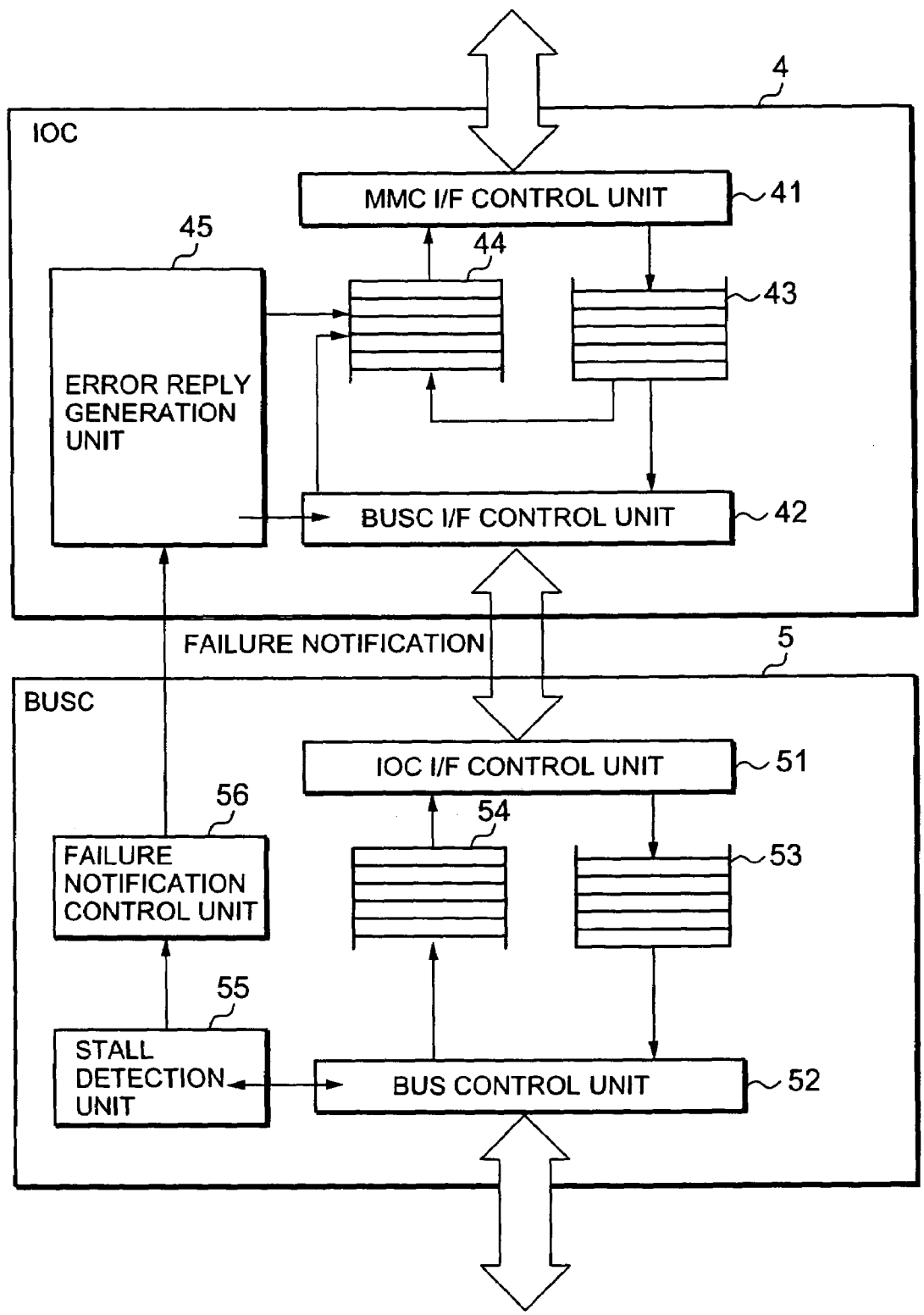
FIG. 2 is a view showing exemplary structures of I/O controller 4 and Bus controller 5 of computer system 200 according to the first exemplary embodiment of the present invention.

FIG. 2 is a block diagram showing exemplary detailed structures of I/O controller 4 and bus controller 5 of computer system 200. Referring to FIG. 2, I/O controller 4 may be configured by including a memory controller and interface control unit 41 to control an interface with memory controller 3, a bus controller and interface controller 42 to control an interface with bus controller 5, a non-execution transaction management table (e.g., non-execution transaction list) 43 to hold the information regarding the non-execution transaction from the processor, an under-execution transaction management table (e.g., in-process transaction list) 44 to hold the information regarding the under-execution transaction from the processor, and an error reply generation unit 45 to control the return of the abnormal end (e.g., error reply) regarding the in-process transaction by the failure information from bus controller 5.

Further, bus controller 5 may be configured by including I/O controller and interface control unit 51 to control an interface with I/O controller 4, PCI bus control unit 52 to control PCI bus 100, request queue 53 to hold the information regarding an execution request transaction from the processor, reply queue 54 to hold the information regarding the reply transaction toward the processor, stall detection unit 55 to have a timer inside and monitor and detect the stall state of the PCI bus control unit, and failure notification control unit 56 to issue a failure information for I/O controller 4 by a stall detection signal from stall detection unit 55.

Subsequently, referring to FIG. 1, an exemplary direct access operation from processor 1 to PCI device 100 in the computer system will be described.

First, for an I/O read and write request from processor 1, the transaction from processor 1 toward the PCI device is transmitted from memory controller 3 to I/O controller 4 through the processor bus. The transaction having reached I/O controller 4 is further transmitted to bus controller 5. The transaction having been routed to the target bus controller 5 is converted into a PCI bus transaction by bus controller 5, and is transmitted to PCI bus 100, thereby reaching a target PCI device (not illustrated). These transmission operations of the transaction may be performed by a general PCI bus cycle (e.g., memory cycle, I/O cycle, configuration cycle, and the like).

Thereafter, if the transaction is a read request or a deferred write request, then the reply and the read data from the PCI device traces a route reverse to that described above, and is returned to processor 1 which is the issuing source of the transaction from PCI bus 100 through bus controller 5, I/O controller 4, memory controller 3, and the processor bus.

Hereinbelow, referring to FIG. 2, the exemplary internal operations of I/O controller 4 and bus controller 5 will be described. The transaction having reached I/O controller 4 is received by memory controller and interface control unit 41, and is stored in non-execution transaction management table 43 holding the information regarding the non-execution transaction from the processor. The transaction having been stored in non-execution transaction management table 43 is transmitted to bus controller 5 through the bus controller and the interface control unit 42.

If the transaction is a read request or a deferred write request, for example, then various pieces of the information (e.g., types of transactions, discrimination of reply destination processors, and the like) regarding the transaction, which should return a reply upon receipt of the reply from bus controller 5, may be stored in under-execution transaction management table 44 holding the information regarding the transaction being executed from the processor.

The transaction having reached bus controller 5 is received by the I/O controller and interface control unit 51, and is stored in request queue 53. The transaction having been stored in request queue 53 is transmitted to PCI bus 100 through PCI bus control unit 52. If the transaction having completed the data transfer is a read request or a deferred write request, for example, then the reply information regarding the transaction (e.g., normal and abnormal discrimination of the execution result and information regarding the read data) may be stored in reply queue 54. The transaction having been stored in reply queue 54 is transmitted to I/O controller 4 through the I/O controller and interface control unit 51.

The reply information on the transaction having reached I/O controller 4 is received by bus controller and interface control unit 42, and is combined with the information regarding the under-execution transaction stored earlier in under-execution transaction management table 44, and is transmitted to memory controller 3 through memory controller and interface control unit 41.

While the outline of the direct access operation to the PCI device has been described above, in the present exemplary embodiment, the following operation may be performed by a newly mounted unit.

Stall detection unit 55 of bus controller 5 may count a duration of a bus busy state (e.g., a non-idle state) of PCI bus 100 shown from PCI bus control unit 52 by using a timer. This timer is cleared when the bus 100 returns to an idle state. Here, if the timer reaches more than a specified time, then stall detection unit 55 determines that the PCI is in a stall state, and notifies failure notification control unit 56 of a stall detection signal.

Failure notification control unit 56 of bus controller 5, upon receipt of the stall detection signal from stall detection unit 55, may transmit the failure information showing that a stall occurs at bus controller 5 to I/O controller 4.

Error reply generation unit 45 of I/O controller 4, upon receipt of the failure information from bus controller 5, generates reply information (e.g., error reply) showing an abnormal end, and returns the reply information as a reply to processor 1 which is the issuing source regarding the transaction (transaction already transmitted to PCI bus 100 under the command of bus controller 5) stored in under-execution transaction management table 44.

In the meantime, error reply generation unit 45 controls bus controller and interface control unit 42. Regarding the non-execution transaction (transaction not transmitted to PCI bus 100 under the command of bus controller 5 having received the failure information) stored in non-execution transaction management table 43, error reply generation unit 45 stops its transmission to bus controller 5 in which the stall occurs. At the same time, error reply generation unit 45 stores the non-execution transaction in under-execution transaction management table 44.

In this manner, the transaction stored in under-execution transaction management table 44, similarly to the transaction already transmitted to PCI bus 100 under the command of bus controller 5, returns the reply information (error reply) showing the abnormal end to processor 1 which is the issuing source.

Figure 3A:
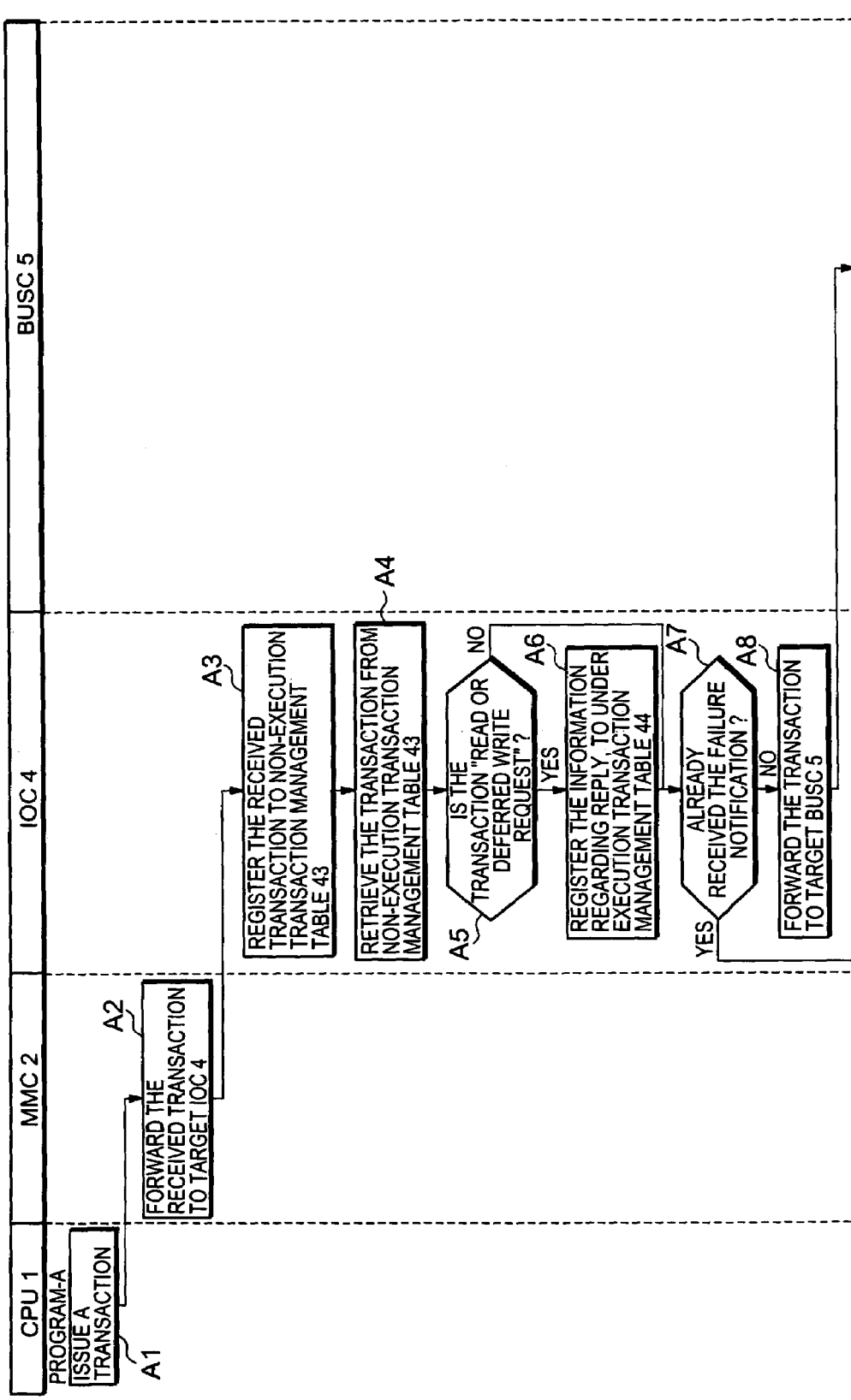
FIGS. 3A-3B are flow charts of an exemplary operation of the first exemplary embodiment.
Figure 3B:
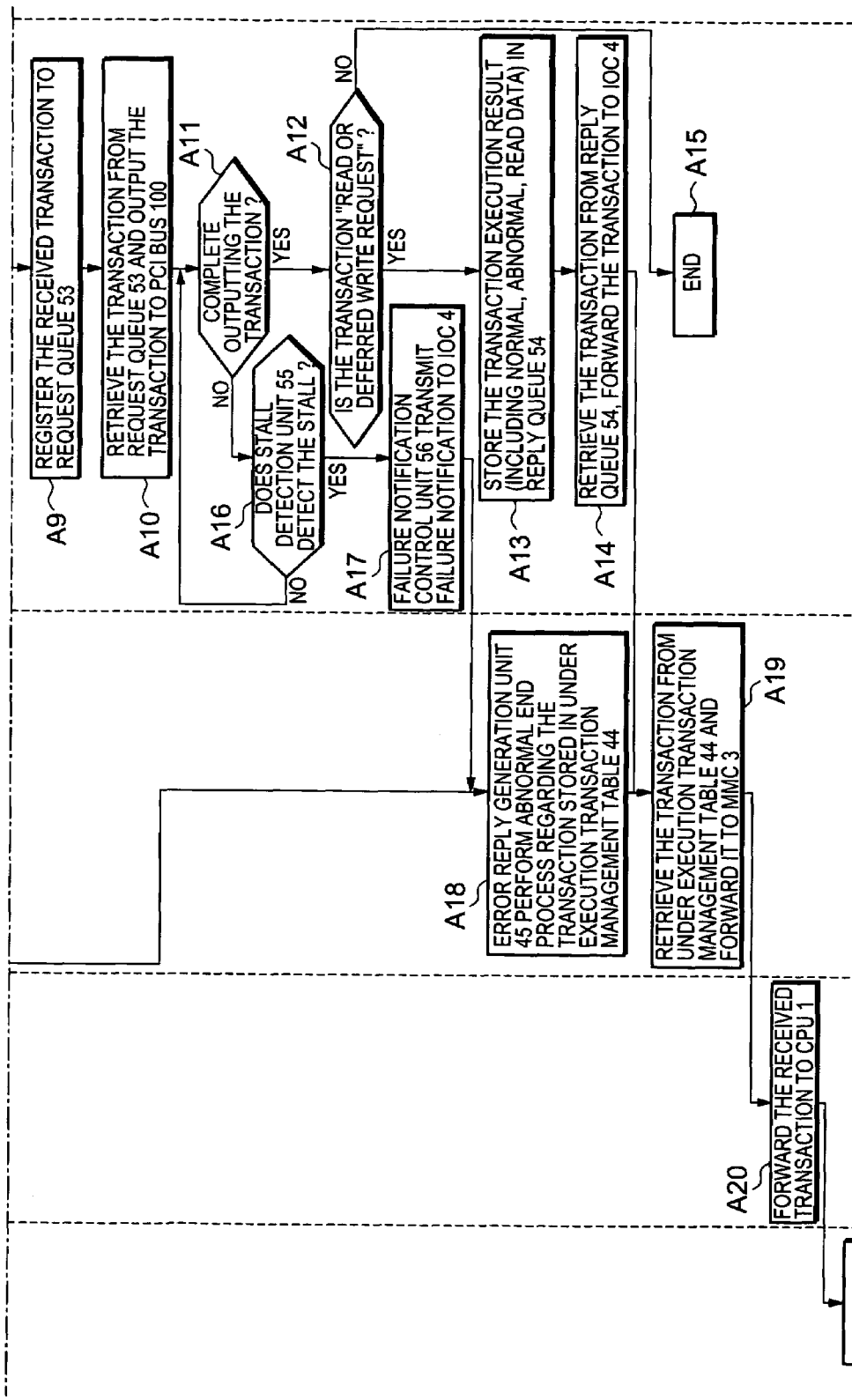

Next, referring to FIGS. 3A and 3B, an exemplary operation of the first exemplary embodiment will be described.

Processor (CPU) 1 issues a transaction to MMU 2, and MMU 2 forwards the received transaction to target I/O controller (IOC) 4 (steps A1, A2). I/O controller (IOC) 4 registers the received transaction in non-execution transaction management table 43 (step A3). I/O controller (IOC) 4 retrieves the transaction from non-execution transaction management table 43 and judges whether the transaction is a "read or deferred write request" (steps A4, A5).

If the transaction is a "read or deferred write request", then I/O controller (IOC) 4 registers the information regarding reply, in under-execution transaction management table 44 (steps A5 Yes, A6).

If the transaction is not a "read or deferred write request" or after step A6, then I/O controller (IOC) 4 judges whether I/O controller (IOC) 4 has already received the failure notification (step A7). If I/O controller (IOC) 4 has already received the failure notification, then I/O controller (IOC) 4 forwards the transaction to target bus controller (BUSC) 5 (steps A7 No, A8).

Bus controller (BUSC) 5 receives the transaction and registers the transaction in request queue 53 (step A9). Bus controller (BUSC) 5 retrieves the transaction from request queue 53 and outputs the transaction to PCI bus 100 (step A10). Bus controller (BUSC) 5 judges whether BUSC 5 completes outputting the transaction (step A11).

If BUSC 5 completes outputting the transaction, then bus controller (BUSC) 5 judges whether the transaction is a "read of deferred write request" (steps A11 Yes, A12). If the transaction is not a "read of deferred write request", then bus controller (BUSC) 5 ends its process (steps A12 No, A15).

If the transaction is a "read of deferred write request", bus controller (BUSC) 5 stores the transaction execution result (including normal, abnormal, or read data) in reply queue 54 (steps A12 No, A13). Bus controller (BUSC) 5 retrieves the transaction from reply queue 54, and forwards the transaction to I/O controller (IOC) 4.

If bus controller (BUSC 5) does not complete outputting the transaction, then bus controller (BUSC) 5 judges whether stall detection unit 55 detects the stall (steps A11 No, A16). If stall detection unit 55 does not detect the stall, then bus controller (BUSC) 5 judges whether bus controller (BUSC) 5 completes outputting the transaction again (steps A16 No, A11). If stall detection unit 55 detects the stall, then failure notification control unit 56 transmits failure notification to I/O controller (IOC) 4 (steps A16 Yes, A17).

After step 17 or if I/O controller (IOC) 4 has not already received the failure notification (step 7 No), error reply generation unit 45 performs abnormal end process regarding the transaction stored in under-execution transaction management table 44 (step A18). I/O controller (IOC) 4 retrieves the transaction from under-execution transaction management table 44, and forwards the transaction to MMC 3 (step A19). Then, MMC 3 receives the transaction and forwards the transaction to processor (CPU) I (step A20). Processor (CPU) 1 receives the transaction and the operation of the first exemplary embodiment ends (step A21).

As described above, the stall state of the bus may be monitored and detected by stall detection unit 55 of the bus controller. At the stall detection time, the abnormal end (error reply) may be returned to processor 1 which may be the issuing source by error reply generation unit 45 of I/O controller 4 regarding the under-execution transaction and the non-execution transaction. In this manner, for example, even when PCI bus 100 runs into a stall state, processor 1 may detect the "timing out" of the transaction, and can allow an appropriate exception handling to be executed instead of starting a system down operation.

Second Exemplary Embodiment

Hereinbelow, a second exemplary embodiment of the present invention which may be characterized by using a new service processor 6 will be described in detail with reference to the drawings.

Figure 4:
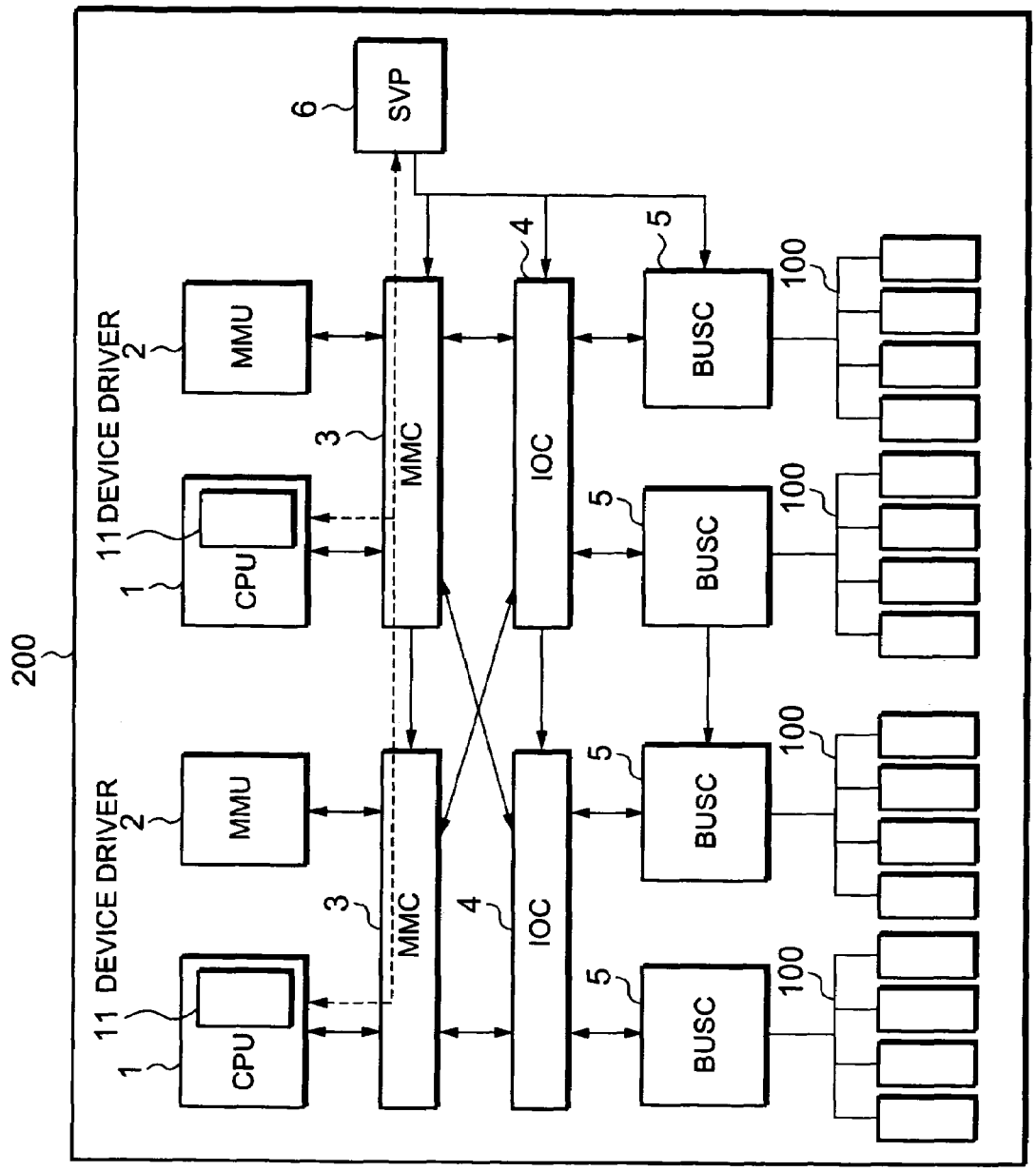
FIG. 4 is a view showing an exemplary structure of computer system 200 according to a second exemplary embodiment of the present invention.

FIG. 4 is a block diagram showing an exemplary structure of computer system 200 according to a second exemplary embodiment of the present invention. As shown in FIG. 4, in the second exemplary embodiment, the basic structure such as a processor (CPU) 1, a main memory unit (MMU) 2, a memory controller (MMC) 3, an I/O controller (IOC) 4, and a bus controller (BUSC) 5 may be the same as the computer system according to the first exemplary embodiment, and a description will be made except for the items already described in the first exemplary embodiment.

In the present exemplary embodiment, processor 1 may have a system monitor program to monitor an operating state of the system, and with respect to the state of the bus, may make a periodic inquiry to the service processor 6, and may monitor the operating state of bus controller 5. The system monitor program is stored in main memory unit (MMU) 2. The system monitor program is retrieved from MMU 2 to processor 1 and performed in processor 1.

The service processor 6, to perform initial setting and diagnosis processing of the system, log collecting processing, and the like, may be connected to memory controller 3 which is a main component of the computer system, I/O controller 4 and bus controller 5, and is configured to realize a state reference of internal resistors of the controller group and various settings thereof. Processor 1 is also connected to the service processor 6 through memory controller 3, and can communicate with the service processor 6, and can send and receive the information.

Figure 5:
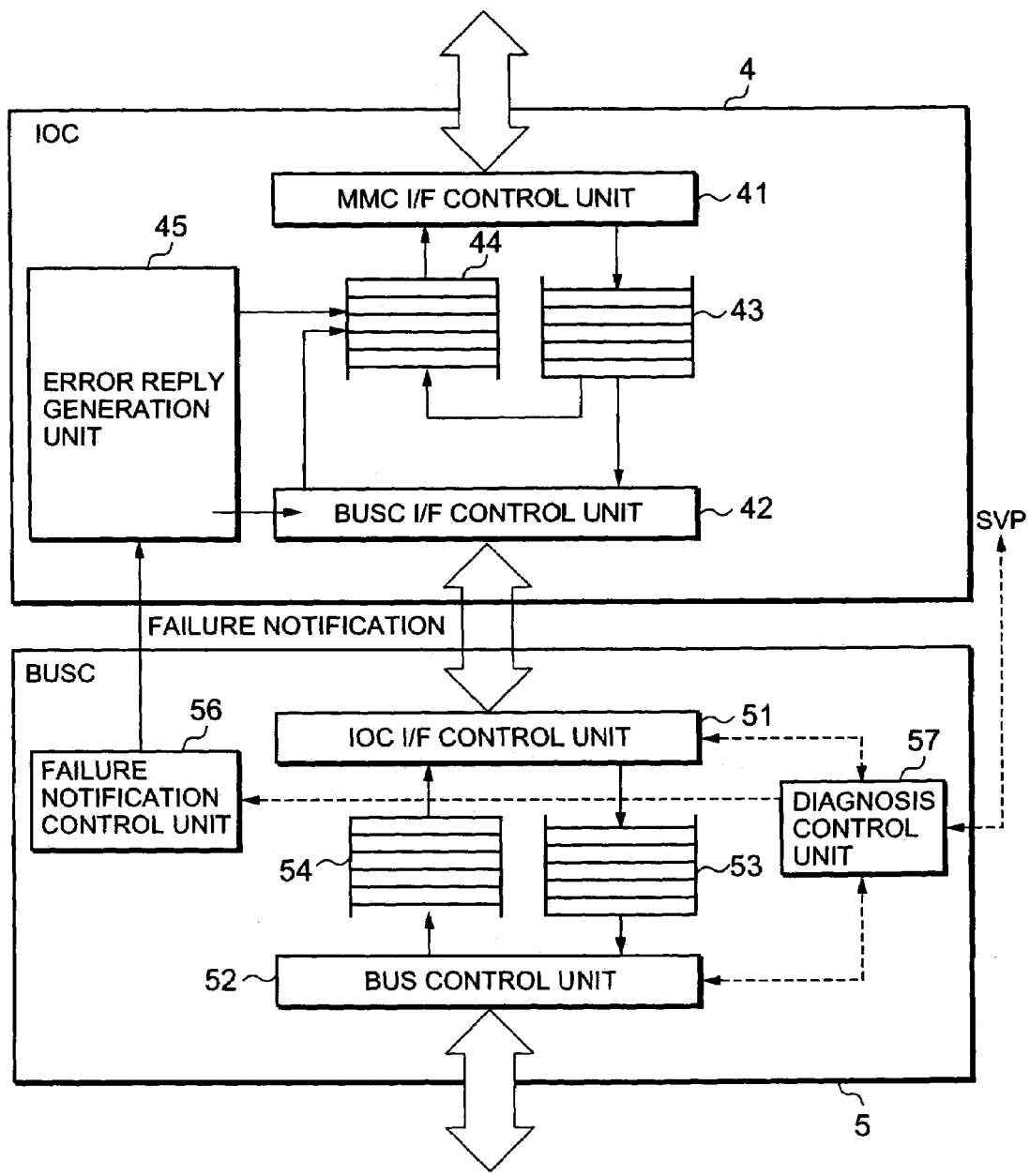
FIG. 5 is a view showing an exemplary structures of I/O controller 4 and the Bus controller 5 of computer system 200 according to the second exemplary embodiment of the present invention.

FIG. 5 is a block diagram showing an exemplary detailed structure of the I/O controller 4 and the bus controller 5 of the present exemplary embodiment. Referring to FIG. 5, bus controller 5 may be provided with diagnosis control unit 57 to be connected to the service processor 6. The service processor 6 can perform the reading of resistors of various control circuits inside bus controller 5 through diagnosis control unit 57. Then, service processor 6 judges whether PCI bus 100 is stalled or not, from a state value of the control register.

The service processor 6 can perform the setting of the failure state for failure notification control unit 56. Stall detection unit 55 in the first exemplary embodiment can detect the stall of PCI bus 100. However, for example, stall detection unit 55 may detect a stall arising from a defect of a control circuit at a level above the PCI bus. Service processor 6 in the second exemplary embodiment may detect a stall arising from a defect of a control circuit above the PCI bus, because service processor 6 monitors overall various kinds of registers in bus controller.

Diagnosis control unit 57 may include the means of performing Read/Write access to various kinds of control registers (e.g., 10 controller and I/F control unit 51, PCI bus control unit 52, etc.), by an instruction from service processor 6

In the present exemplary embodiment, for example, the following operation is performed by service processor 6. Processor 1 may access to the service processor 6 at time intervals specified by the system monitor program and may read the value of a control resistor inside bus controller 5.

Furthermore, stall detection unit 55 in the first exemplary embodiment and service processor 6 in combination can be used for detecting a stall.

Moreover, in the second exemplary embodiment, processor 1 monitors an operation state of bus controller 5 by obtaining information from service processor 6 periodically. Processor 1 may directly control diagnosis control unit 57 without service processor 6 by providing a circuit so that processor 1 directly controls diagnosis control unit 57.

Subsequently, processor 1 determines whether or not bus controller 5 is in a stall state according to the condition specified by the system monitor program. Here, if it is determined that bus controller 5 is in a stall state, processor 1 accesses the service processor 6, and instructs failure notification control unit 56 inside bus controller 5 to set bus controller 5 to a failure state.

Failure notification control unit 56, upon setting of the present failure state, transmits the failure information showing that the stall failure occurs in the controller 5 to I/O controller 4. The processing thereafter is similar to the first exemplary embodiment, and error reply generation unit 45 of I/O controller 4 returns the abnormal end (error reply) to processor 1 of the issuing source regarding the under-execution transaction and the non-execution transaction relating to the bus having receiving the failure information. Thus, even when bus controller 5 runs into the stall state, processor 1 can perform a control so as not to detect the "timing out" of the transaction, thereby avoiding a system down state/operation and executing an appropriate exception handling by processor 1.

Figure 6A:
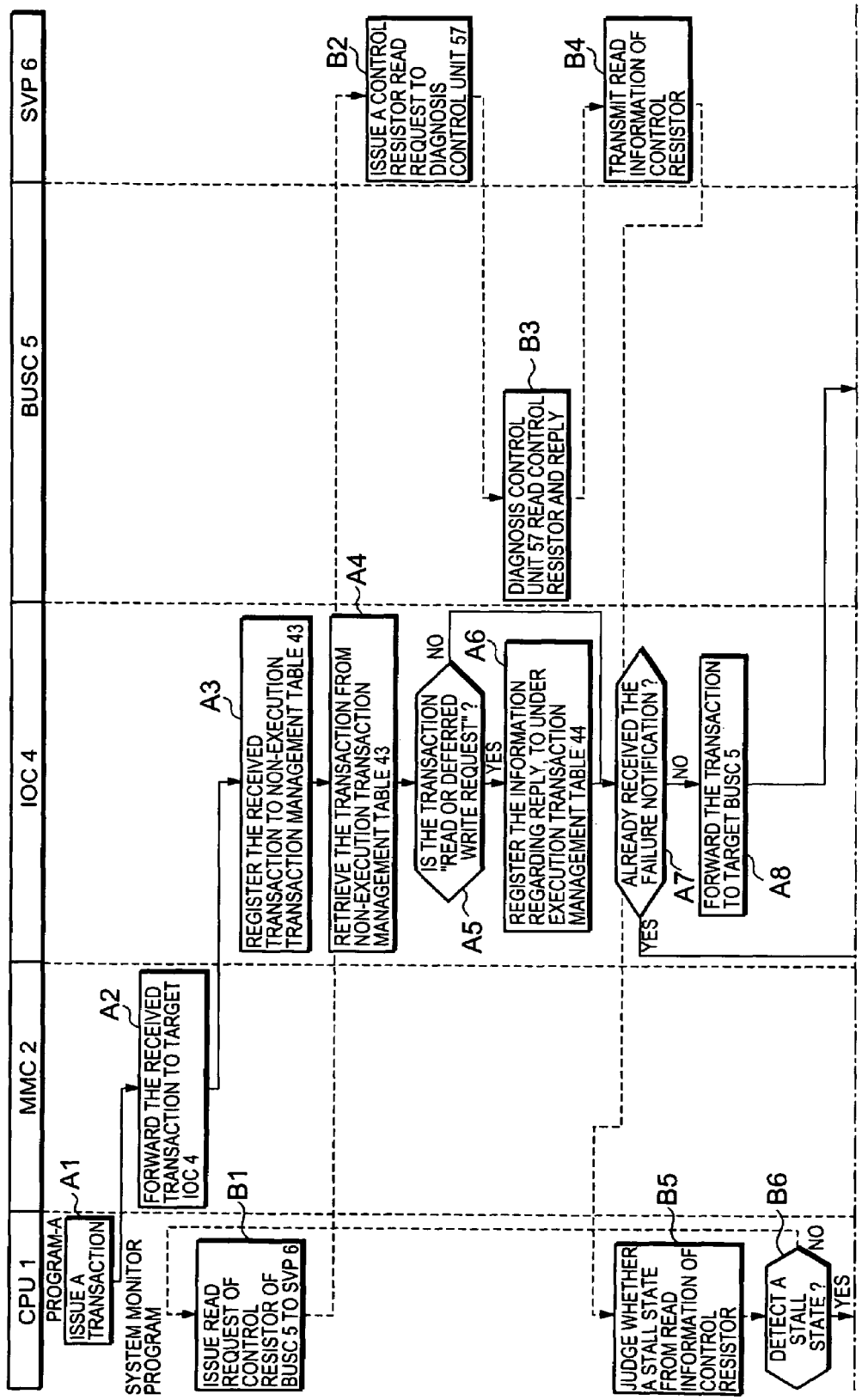
FIGS. 6A-6B are flow charts of an exemplary operation of the second exemplary embodiment.
Figure 6B:
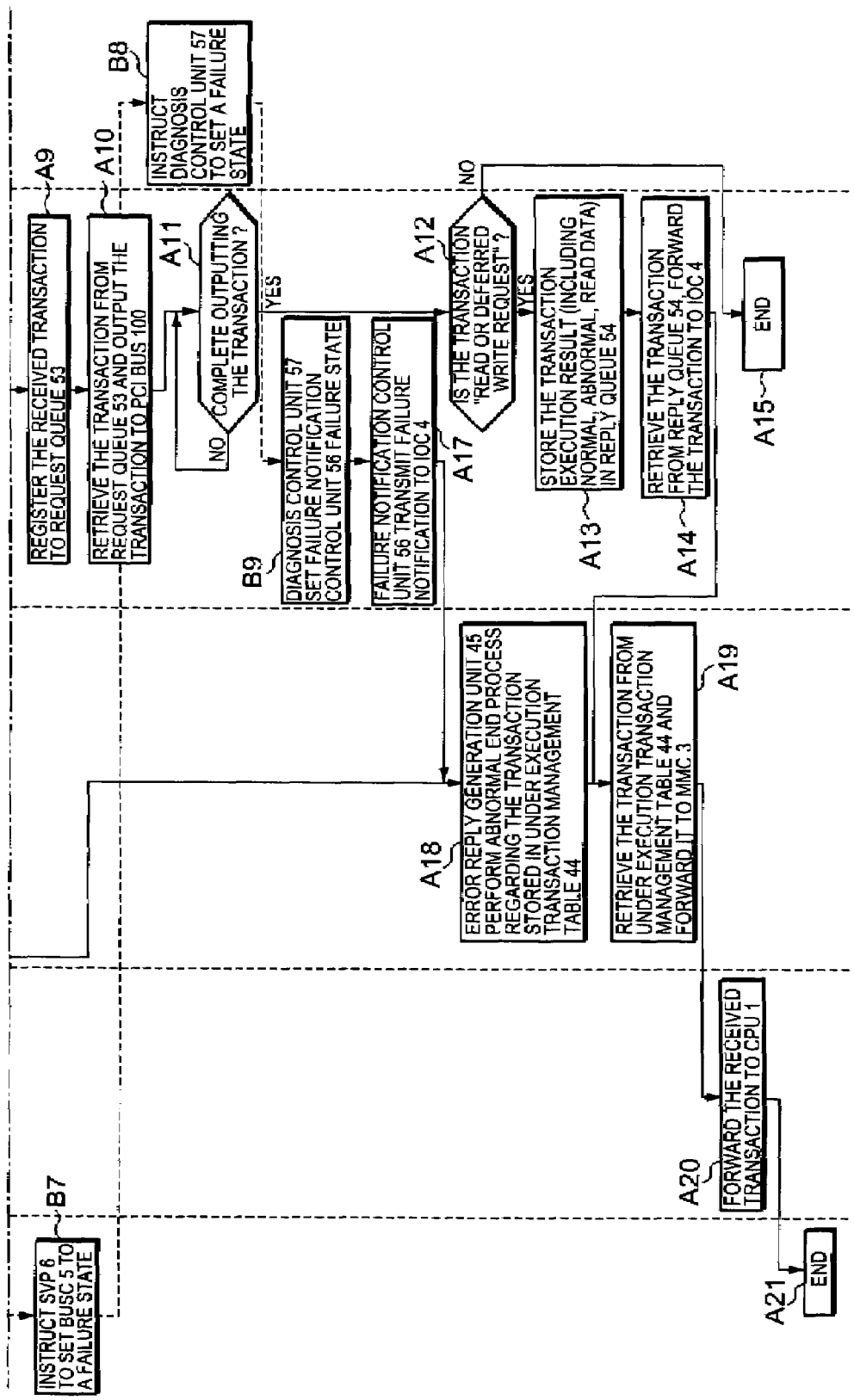
Figure 7:
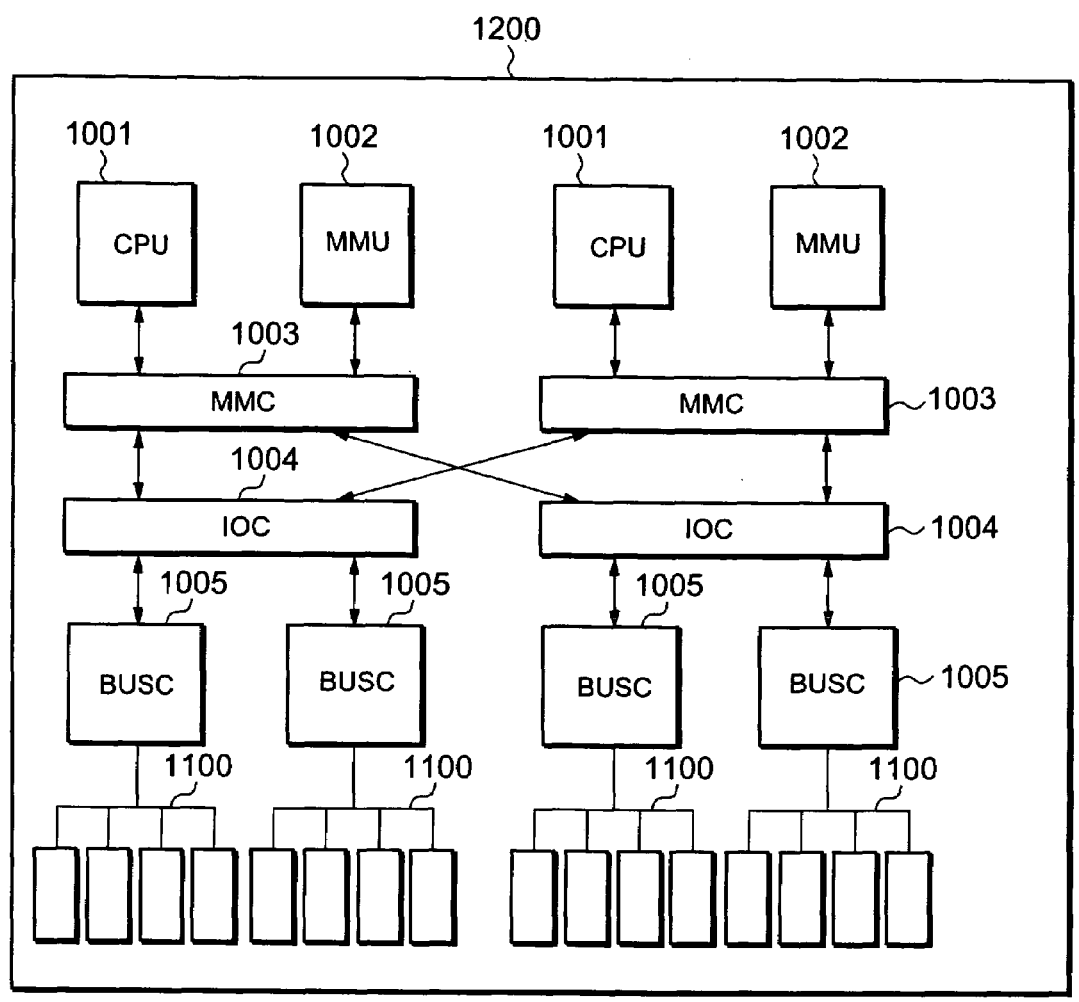
FIG. 7 is a view showing a basic structural example of a conventional computer system 1200.
Figure 8:
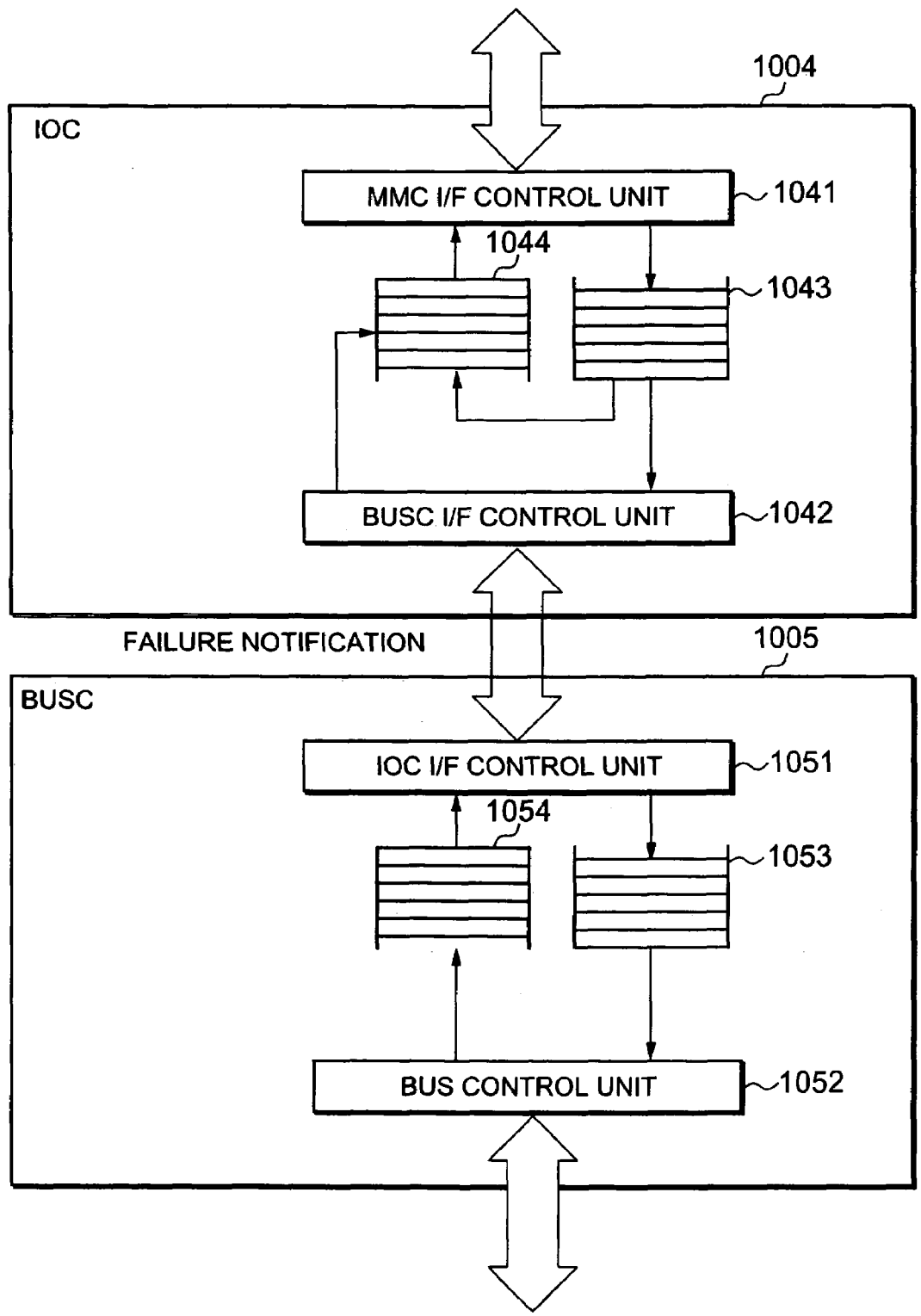
FIG. 8 is a view showing structures of I/O controller 1004 and the Bus controller 1005 of the conventional computer system 1200.

Next, referring to FIGS. 6A and 6B, an exemplary operation of the second exemplary embodiment will be described. FIGS. 6A and 6B are flow charts of the operation of the second exemplary embodiment. The difference between FIG. 3A-3B and 6A-6B may be that processor 1 executes a system program which monitors an operation state of computer system 200 and service processor 6 is operating. The operation steps different from those which are shown in FIGS. 3A and 3B (i.e., steps B1-B8) will be described.

Processor (CPU) 1 issues a read request of control register of bus controller (BUSC) 5 to service processor (SVP) 6 (step B1). Service processor (SVP) 6 receives the read request and issues the control register read request to diagnosis control unit 57 (step B2). Diagnosis control unit 57 reads control resistor and reply to service processor (SVP) 6 (step B3).

Service processor (SVP) 6 receives the replies and transmits read information of control resistor to Processor (CPU) 1 (step B4).

Processor (CPU) 1 judges whether a stall state exists or not, from the read information of the control register (steps B5, B6). If it is not a stall state, then processor (CPU) 1 issues a read request of control register of bus controller (BUSC) 5 to service processor (SVP) 6 again (step B6 No, B1). If it is a stall state, then processor (CPU) 1 instructs service processor (SVP) 6 to set bus controller (BUSC) 5 to a failure state (B7). Then, service processor (SVP) 6 instructs diagnosis control unit 57 to set a failure state (step B8). Diagnosis control unit 57 sets failure notification control unit 56 into a failure state (step B9). Failure notification control unit 56 performs the same operation as described in the first embodiment (step A17).

In the above described exemplary embodiments, the system monitor program may be executed in the service processor 6, and the stall state of bus controller 5 itself may be monitored and detected through the service processor 6 so as to return the error reply.

While a description has been made of the exemplary embodiments of the present invention, the present invention can be configured by stall detection unit 55 (or service processor 6) of bus controller 5, failure notification control unit 56, and error reply generation unit 45 of I/O controller 4 as main component thereof. Further, by the present configuration, the stall state of PCI bus 100 is monitored and detected, and the error reply is returned so that an appropriate measure can be taken.

In the above described exemplary embodiments, while a description has been made on the present invention by citing an example in which the present invention is adapted to the PCI system, it goes without saying that other input/output bus systems applicable to the principle of the present invention can be equally adapted to the present invention or by appropriately changing the design.

While this invention has been described with reference to exemplary embodiments, this description is not intended as limiting. Various modifications of the illustrative embodiments, as well as other embodiments of the invention, will be apparent to persons skilled in the art upon taking description as a whole. It is, therefore, contemplated that the appended claims will cover any such modifications or embodiments as fall within the true scope of the invention.

Further, the inventor's intent is to encompass all equivalents of all the elements of the claimed invention even if the claims are amended during prosecution.

This application is based on, and claims priority to, Japanese Patent Application No. 2004-364955 filed on Dec. 16, 2004 and including specification, claims, drawings and summary. The disclosure of the above Japanese Patent Application is incorporated herein by reference in its entirety.

What is claimed is:

1. A computer system, comprising:
    a processor that executes a device driver; and
    a bus controller that controls an input/output bus that connects a plurality of input/output devices, wherein said bus controller includes:
        a stall detector that detects a stall state of said input/output bus, said stall detector detecting said stall state by measuring a non-idle time of said input/output bus; and
        an error reply generator that transmits an error reply to said processor regarding a transaction transmitted to said input/output bus where said stall state is detected, wherein said error reply generator transmits said error reply to said processor so that said processor avoids detecting a transaction timeout regarding to the transaction transmitted to said input/output bus.

2. The computer system according to claim 1, further comprising:
    a main memory;
    a main memory controller operatively coupled to said main memory; and
    an I/O controller, operatively coupled to said main memory controller, that performs an execution management of the transaction, and transmits an error reply regarding under-execution and non-reply transactions to said processor, said I/O controller including said error reply generator.

3. The computer system according to claim 1, further comprising: a failure notifier that receives a stall detection signal from said stall detector and notifies said error reply generator of a failure information, said bus controller including said failure notifier, wherein said error reply generator receives said failure information from said failure notifier and transmits an error reply to said processor regarding said transaction relating to said input/output bus which is given said failure information.

4. The computer system according to claim 2, wherein said I/O controller includes:
    a non-execution transaction list that holds a non-execution transaction; and
    an under-execution transaction list that holds an under-execution and non-reply transaction,
    wherein said I/O controller renews said non-execution transaction list and said under-execution transaction list by:
        holding back a transaction, relating to said input/output bus which is given said failure information, from being transmitted to said bus controller;
        adding said transaction to said under-execution transaction list;
        transmitting an error reply to said processor regarding said transaction;
        and erasing said transaction from said under-execution transaction list.

5. The computer system according to claim 3, further comprising: a service processor that is connected to said bus controller, wherein said bus controller includes: a diagnosis controller that reads a value of a control register of said bus controller by an instruction of said service processor, and transmits a stall detection signal to said failure notifier by an instruction of said service processor.

6. The computer system according to claim 1, wherein, said stall detector detects a stall state according to whether or not a busy state of said input/output bus continues for a predetermined period of time based on a value of a control register of a bus control unit of said bus controller.

7. The computer system according to claim 1, wherein said input/output bus comprises a PCI (Peripheral Component Interconnect) bus.

8. A method of detecting a stall in a computer system, comprising:
    providing a processor that executes a device driver; and
    controlling, by a bus controller, an input/output bus that connects a plurality of input/output devices;
    detecting a stall state of said input/output bus by measuring a non-idle time of said input/output bus; and
    transmitting an error reply to said processor regarding a transaction transmitted to said input/output bus where said stall state is detected so that said processor avoids detecting a transaction timeout regarding to the transaction transmitted to said input/output bus.

9. The method of detecting a stall in a computer system according to claim 8, further comprising: performing, by an I/O controller, execution management of the transaction, and transmitting an error reply regarding under-execution and non-reply transactions to said processor.

10. The method of detecting a stall in a computer system according to claim 8, further comprising:
notifying, by said bus controller, said I/O controller of a failure information; and
transmitting, by said I/O controller, an error reply to said processor regarding a transaction relating to said input/output bus which is given said failure information.

11. The method of detecting a stall in a computer system according to claim 9, further comprising:
holding, by a non-execution transaction list, a non-execution transaction with said I/O controller;
holding, by an under-execution transaction list, an under-execution and non-reply transaction with said I/O controller; and
renewing said non-execution transaction list and said under-execution transaction list by:
holding back a transaction, relating to said input/output bus which is given said failure information, from being transmitted to said bus controller;
adding said transaction to said under-execution transaction list;
transmitting an error reply to said processor regarding said transaction; and
erasing said transaction from said under-execution transaction list.

12. The method of detecting a stall in a computer system according to claim 8, further comprising:
connecting a service processor to said bus controller, reading a value of a control register of said bus controller by an instruction of said service processor; and
transmitting a stall detection signal to a failure notifier by an instruction of said service processor.

13. The method of detecting a stall in a computer system according to claim 8, further comprising: detecting a stall state according to whether or not a busy state of said input/output bus continues for a predetermined period of time based on a value of a control register of a bus control unit of said bus controller.

14. The method of detecting a stall in a computer system according to claim 8, further comprising: providing a PCI (Peripheral Component Interconnect) bus as said input/output bus.

15. The method of detecting a stall in a computer system according to claim 8, further comprising:
issuing a transaction to—a main memory controller;
forwarding said transaction to an I/O controller;
registering said transaction to a non-execution transaction list;
retrieving said transaction from said non-execution transaction list;
judging whether said transaction comprises a "read or deferred write request";
when said transaction comprises said "read or deferred write request", registering said information regarding a reply—to an under-execution transaction list; and
after registering said information regarding said reply to said under-execution transaction list or when said transaction comprises said "read or deferred write request", judging whether said I/O controller has already received a failure notification.

16. The method of detecting a stall in a computer system according to claim 15, further comprising:
when said I/O controller has not already received said failure notification, forwarding said transaction to said bus controller;
registering said transaction to a received request queue;
retrieving said transaction from said request queue;
outputting said transaction to said input/output bus; and
judging whether said transaction is completed.

17. The method of detecting a stall in a computer system according to claim 16, further comprising:
when said transaction is completed, judging whether said transaction comprises said "read or deferred write request";
when said transaction comprises said "read or deferred write request", storing a transaction execution result in a reply queue;
retrieving said transaction from said reply queue;
forwarding said transaction to said I/O controller;
when said transaction is not completed, judging whether a stall detector detects a stall;
when said stall detector does not detect a stall, judging whether said transaction is completed; and
when said stall detector detects a stall, transmitting a failure notification to said I/O controller.

18. The method of detecting a stall in a computer system according to claim 17, further comprising:
when said I/O controller has already received said failure notification or after transmitting said failure notification to said I/O controller, performing an abnormal end process regarding said transaction stored in said under-execution transaction list;
when forwarding said transaction to said I/O controller or after performing abnormal end process regarding said transaction stored in said under-execution transaction list, retrieving said transaction from said under-execution transaction list and forwarding said transaction to said main memory controller; and
forwarding said transaction to said processor.

19. The method of detecting a stall in a computer system according to claim 8, further comprising:
issuing a read request of a control register of said bus controller to a service processor;
issuing said read request of said control register to a diagnosis controller;
reading said control register and replying to said service processor;
issuing said control register information to said processor;
judging whether a stall state exists from read information of said control register;
when detecting a stall state, instructing said service processor to set said bus controller to a failure state;
instructing said diagnosis controller to set a failure state; and
setting a failure notifier to a failure state.

20. A computer readable storage medium storing a program of machine-readable instructions executable by a digital processing apparatus, said program causing a computer system to perform a method of claim 8.

21. A computer system, comprising:
a processor that executes a device driver; and
a bus controller that controls an input/output bus that connects a plurality of input/output devices, wherein said bus controller includes:
a stall detector that detects a stall state of said input/output bus, said stall detector detecting said stall state by measuring a non-idle time of said input/output bus; and an error reply generator that transmits an error reply to said processor regarding a transaction transmitted to said input/output bus where said stall state is detected, wherein said error reply generator transmits said error reply to said processor before said processor detects a transaction timeout regarding to the transaction transmitted to said input/output bus.

22. A method of detecting a stall in a computer system, comprising:

providing a processor that executes a device driver;

controlling, by a bus controller, an input/output bus that connects a plurality of input/output devices;

detecting a stall state of said input/output bus by measuring a non-idle time of said input/output bus; and transmitting an error reply to said processor regarding a transaction transmitted to said input/output bus where said stall state is detected before said processor detects a transaction timeout regarding to the transaction transmitted to said input/output bus.

23. The computer system of claim 1, wherein the stall detector detects the stall state by measuring the non-idle time within the input/output bus.

24. The computer system of claim 1, wherein the stall detector detects the stall state by measuring the non-idle time of the input/output bus without the processor.

* * * * *